United States Patent [19]

Nelson

[11] Patent Number: 5,191,328

[45] Date of Patent: Mar. 2, 1993

[54] TRAILER HITCHING AID AND METHOD USING RECEPTION DELAY OF DIFFERENT VELOCITY SIGNALS

[75] Inventor: Terry L. Nelson, Camas Valley, Oreg.

[73] Assignee: Donald L. Gambill, Roseburg, Oreg.

[21] Appl. No.: 537,172

[22] Filed: Jun. 13, 1990

[51] Int. Cl.$^5$ .................. B60Q 9/00; G01S 3/808; B60D 1/00

[52] U.S. Cl. ............... 340/870.06; 340/870.11; 340/870.15; 340/870.28; 340/870.29; 340/431; 340/686; 33/264; 33/286; 250/491.1; 280/477; 342/125; 364/561; 367/127; 367/128

[58] Field of Search ............ 340/870.03, 870.05, 340/870.06, 870.11, 870.15, 870.27, 870.3, 870.28, 870.29, 431, 686, 687; 455/49, 96, 99, 345, 346; 324/609; 33/264, 286, 1 PT, 707, 713; 364/559, 560, 561, 603; 180/167, 168, 169; 280/477, 432; 342/118, 23, 125-129, 140, 146; 114/270; 250/491.1; 367/127, 128

[56] References Cited

U.S. PATENT DOCUMENTS

| | | | |
|---|---|---|---|
| 2,188,293 | 1/1940 | Williams | 114/270 |
| 3,046,549 | 7/1962 | Kalmus | 280/477 |
| 3,901,356 | 8/1975 | Black | 280/477 |
| 3,924,257 | 12/1975 | Roberts | 340/431 |
| 3,938,122 | 2/1976 | Mangus . | |
| 3,978,445 | 8/1976 | Gravett | 367/127 |
| 4,055,830 | 10/1977 | Wilson et al. | 367/128 |
| 4,122,390 | 10/1978 | Kollitz et al. | 340/431 |
| 4,136,394 | 1/1979 | Jones et al. | 367/128 |
| 4,187,494 | 2/1980 | Jessee . | |
| 4,234,942 | 11/1980 | Prause et al. | 367/128 |
| 4,264,978 | 4/1981 | Whidden | 367/128 |
| 4,297,700 | 10/1981 | Nard et al. | 342/125 |
| 4,552,376 | 11/1985 | Cofer | 280/477 |
| 4,558,439 | 12/1985 | Güdesen | 367/127 |
| 4,601,025 | 7/1986 | Lea | 367/127 |
| 4,627,511 | 12/1986 | Yajima | 250/491.1 |
| 4,646,092 | 2/1987 | Schreuder | 342/125 |
| 4,710,020 | 12/1987 | Maddox et al. | 180/167 |
| 4,728,995 | 3/1988 | Hane | 342/140 |
| 4,738,133 | 4/1988 | Breckel et al. | 340/870.28 |
| 4,751,689 | 6/1988 | Kobayashi | 367/128 |
| 4,813,025 | 3/1989 | Rowland et al. | 367/128 |
| 4,914,735 | 4/1990 | Ichiyoshi | 342/125 |
| 4,938,495 | 7/1990 | Beasley et al. | 340/431 |
| 4,988,116 | 1/1991 | Evertsen | 340/686 |

FOREIGN PATENT DOCUMENTS

925756  5/1982  U.S.S.R. .................. 340/686

Primary Examiner—Donald J. Yusko
Assistant Examiner—John Giust
Attorney, Agent, or Firm—Olson & Olson

[57] ABSTRACT

A trailer hitching aid includes a dual transmitter mounted on the forward end of a trailer or other vehicle to be towed and arranged to transmit pulses of infrared light and pulses of ultrasonic sound. A towing vehicle mounts on its rear end an infrared light detector and a pair of laterally spaced ultrasonic sound detectors. The detectors are incorporated in an electrical circuit which includes a computer the program of which operates to measure the time difference between the detection of a light burst and the detection of sound bursts. The time differences then are utilizes to calculate the distance from each detector to the transmitter, and the distances and angles between the detectors and transmitter are displayed on the computer screen as visual indications to direct the operator of the towing vehicle to maneuver the vehicle to back it up and bring the hitch components on the vehicles into coupling registry.

7 Claims, 6 Drawing Sheets

TRAILER HITCHING AID AND METHOD USING RECEPTION DELAY OF DIFFERENT VELOCITY SIGNALS

BACKGROUND OF THE INVENTION

This invention relates to trailer hitches, and more particularly to a device for aiding the operator of a towing vehicle in backing the towing vehicle into registry with the trailer hitch component on the trailer.

Many types of trailer hitching aids have been proposed heretofore. One type utilizes a flexible line between the towed and towing vehicles and senses the angle of the line relative to the towing vehicle to instruct the operator how to maneuver the towing vehicle into alignment. A proximity sensor is used to indicate when hitch components are in vertical alignment. Typical of this type of aid are those disclosed in U.S. Pat. Nos. 3,938,122 and 4,187,494.

Another type of hitching aid proposed heretofore utilizes a light beam on a towed vehicle to align with a target on a towing vehicle, the position of the light on the target directing the operator to bring the towing vehicle into alignment with the towed vehicle. This type is exemplified by U.S. Pat. Nos. 3,901,536 and 4,552,376.

Still another type of hitching aid proposed heretofore utilizes an electric signal beam transmitted from a towed vehicle to one or more receivers on a towing vehicle, the angle of the beam providing direction guidance and a proximity sensor identifying when the hitch components are in vertical alignment. This type is exemplified by U.S. Pat. Nos. 3,924,257 and 4,627,511.

Another type of hitching aid proposed heretofore utilizes a variable resistor on a towing vehicle, and feelers extend from the rotatable arm of the resistor for engagement by the tongue of a towed vehicle, the angle of the feeler guiding the operator to move the hitch component on the towing vehicle into registry with the hitch component on the towed vehicle. This type is exemplified by U.S. Pat. No. 4,122,390.

Also proposed heretofore are a wide variety of types of arms mounted one on a towing vehicle and another on a towed vehicle, the operator being required to maneuver the towing vehicle to bring the pair of arms into close proximity to align the hitch components. This type is difficult to use at night and it is subject to severe inaccuracies because of optical parallax and the general conditions of sight of various operators.

There also are various tracking systems by which a following vehicle may track the direction and distance from a leading vehicle or from a target object. These cannot operate to bring hitch components into vertical registry however. These are illustrated by U.S. Pat. Nos. 2,188,293; 3,046,549; and 4,710,020.

All of the foregoing types of aids are characterized by one or more of such limitations and disadvantages as requiring mechanical linkages between vehicles, introduction of errors of parallax and visibility, and involving the complexity and cost of separate electrical components for direction and distance detections.

SUMMARY OF THE INVENTION

The hitching aid and method of this invention involves the transmission between towed and towing vehicles of signals which travel through air at different velocities, measuring the time differences of reception of such signals intermittently as the distance between the vehicles decreases, and utilizing those time differences to activate a visual indicator which identifies the distance and angular relationship between the vehicles progressively, whereby to provide guidance for an operator of the towing vehicle to bring the trailer hitch components on the vehicles into position for coupling.

The principal objective of this invention is to provide a trailer hitching aid and method which overcomes the aforementioned limitations and disadvantages of prior hitching aids and methods.

Another objective of this invention is the provision of a trailer hitching aid and method of the class described which enables an operator of a towing vehicle to maneuver the vehicle into hitch coupling position with speed, facility and precision.

Still another objective of this invention is the provision of a trailer hitching aid and method of the class described by which the maneuvering of the towing vehicle is achieved by the operator viewing a visual indicator which identifies the distance and angular relationship of the vehicles progressively as the towing vehicle is backed toward the vehicle to be towed.

A further objective of this invention is the provision of a trailer hitching aid of the class described which is of simplified construction for economical manufacture and maintenance, and is capable of installation with speed and facility.

The foregoing and other objects and advantages of this invention will appear from the following detailed description, taken in connection with the accompanying drawings of a preferred embodiment.

DESCRIPTION OF THE PREFERRED EMBODIMENT

Figure 1:
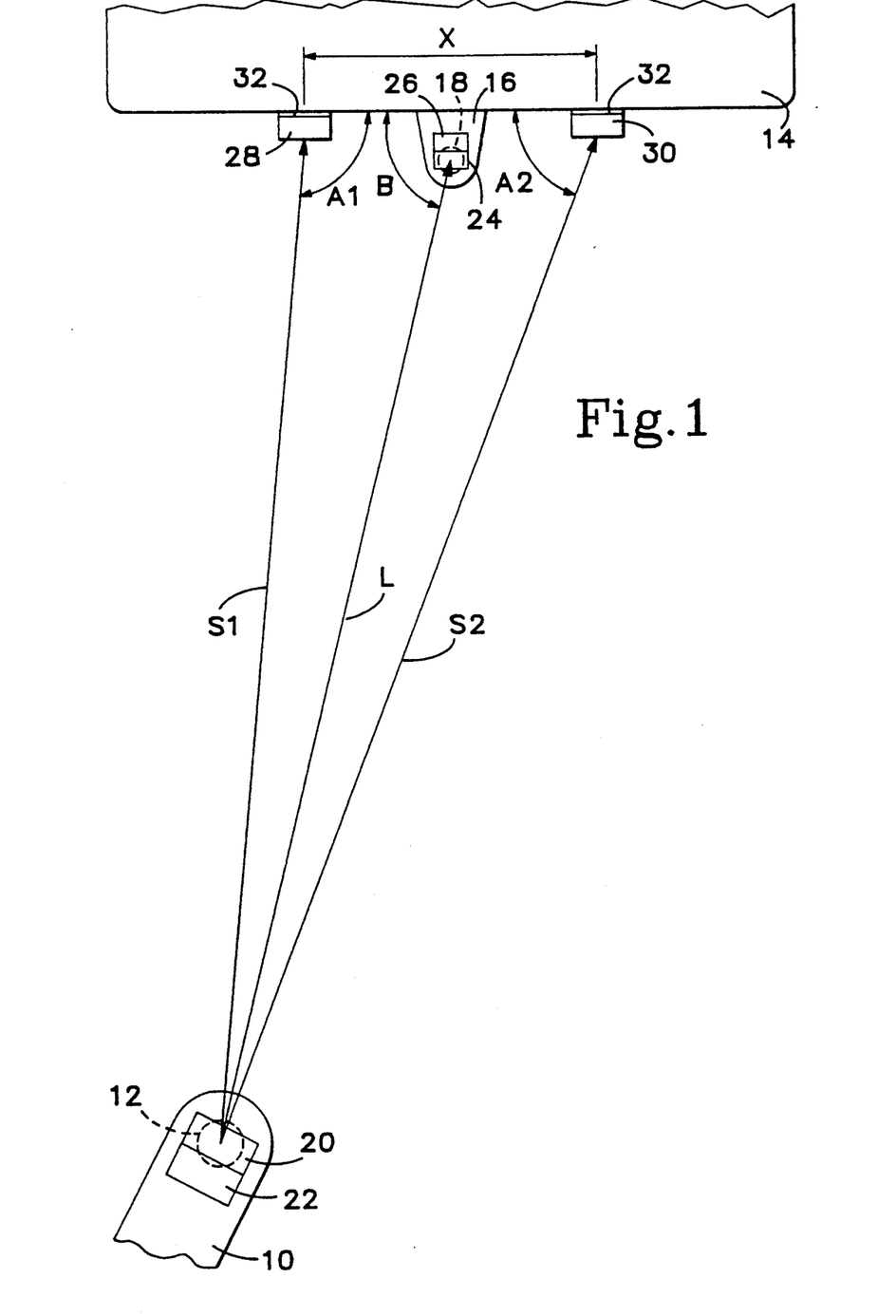
FIG. 1 is a fragmentary plan view showing the rear end of a towing vehicle and the forward end of a vehicle to be towed in spaced apart relationship and illustrating schematically the distance and angular relationship of a transmitter on the towed vehicle and laterally spaced apart receivers on the towing vehicle.

FIG. 1 shows the front portion of the tongue 10 of a trailer to be towed, fitted with the socket component 12 of a conventional trailer hitch. Since such a hitch component is usable on the forward end of a tow bar attached to the front end of a motor vehicle to be towed, and may be used with boat trailers and other forms of vehicles as well, it is to be understood that the terms "trailer" and "towed vehicle" as used herein are equivalent and that they include not only trailers and vehicles but any other vehicular device or object intended to be towed by coupling to a towing vehicle.

FIG. 1 also shows the rear portion of a towing vehicle 14 fitted with a bracket 16 which mounts the ball component 18 of a trailer hitch for cooperative coupling with the socket component 12 on a vehicle to be towed.

In accordance with this invention, a transmitter component 20 is mounted on the forward end of a vehicle 10 to be towed, preferably above the socket component 12 as by means of a support bracket 22. The transmitter component provides for the transmission of two signals that travel through air at different velocities. In the preferred embodiment of the invention, and as described in detail hereinafter, one signal is provided in the form of infrared light pulses and the other in the form of ultrasonic sound pulses.

The rear end of the towing vehicle 14 mounts a receiver 24 for the faster traveling signal source, e.g. the infrared light pulses exemplified above. The receiver preferably is mounted above the ball component 18 as by means of a support bracket 26 secured to bracket 16. Also mounted at the rear end of the towing vehicle is a pair of receivers 28 and 30 for the slower traveling signal source, e.g. the ultrasonic sound pulses exemplified above. These receivers preferably are mounted at the rear of the towing vehicle 14 to opposite sides of the receiver 24 as by means of brackets 32.

If desired, the bracket mountings for the receivers may afford pivotal adjustment of the receivers to allow for aiming the receivers toward the transmitter.

Figure 2:
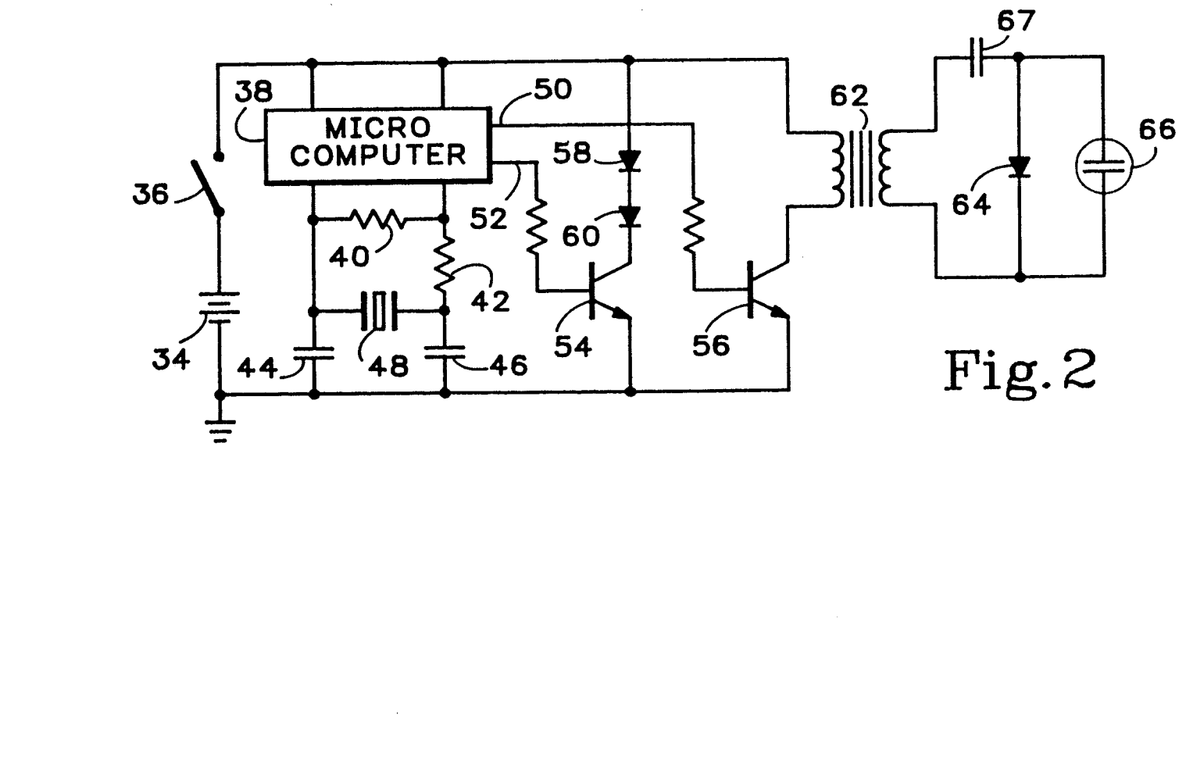
FIG. 2 is a schematic diagram of an electric circuit of a transmitter component usable in the hitching aid of this invention.

Referring now to FIG. 2 of the drawings, the dual transmitter circuit illustrated therein is supplied electric potential from battery 34 through control switch 36. A microcomputer 38 provides a programmed output of high frequency electrical pulse signals of selected frequency at a selected interval of time. The network of resistors 40 and 42, capacitors 44 and 46 and piezoelectric crystal 48 provides a stable time base for the microcomputer.

For example, the microcomputer may be programmed to output a pulse burst of 40 KHz for 625 micro seconds twice each second. Thus, 25 narrow pulses are output in 625 micro seconds at a frequency of 40 KHz each half second. These signals are applied to the bases of the switching transistors 54 and 56 by conductors 50 and 52 which rapidly turn the infrared light emitting diodes 58 and 60 and transformer 62 off and on at the pulse burst frequency.

Diode 64 rectifies the signal from the secondary of transformer 62 so as to put a bias, for example 100-175 volts DC on the ultrasonic transducer 66. Capacitor 67 passes the high frequency carrier signal to the ultrasonic transducer.

Accordingly, the transmitter circuit transmits a short burst of ultrasonic sound at the same time it transmits a short burst of infrared light.

The pulse timing and carrier frequency are not critical. The high frequency carrier preferably is set to match the characteristics of the infrared light emitting diodes 58 and 60 and the ultrasonic transducer 66.

Illustrative of the microcomputers 38 usable for this invention is Model COP420H manufactured by National Semiconductor Corporation. Similarly, usable ultrasonic transducers 66 are exemplified by Model 7000 manufactured by Polaroid Corporation, Referring now to FIG. 3 of the drawings, the infrared light signals from the transmitter are received by the infrared light detector 68. A typical light detector usable for this invention is Model GP1U52X manufactured by Sharp Electronics. The output at conductor 70 changes state when a light signal is received, and is limited to a selected maximum, for example 5.1 volts, by Zener diode 72. This output is then detected by the light signal input of a visual display device. In the embodiment illustrated, this light signal is input to the PB0 input of a game paddle connector 74 on an Apple II computer 76.

Figure 3:
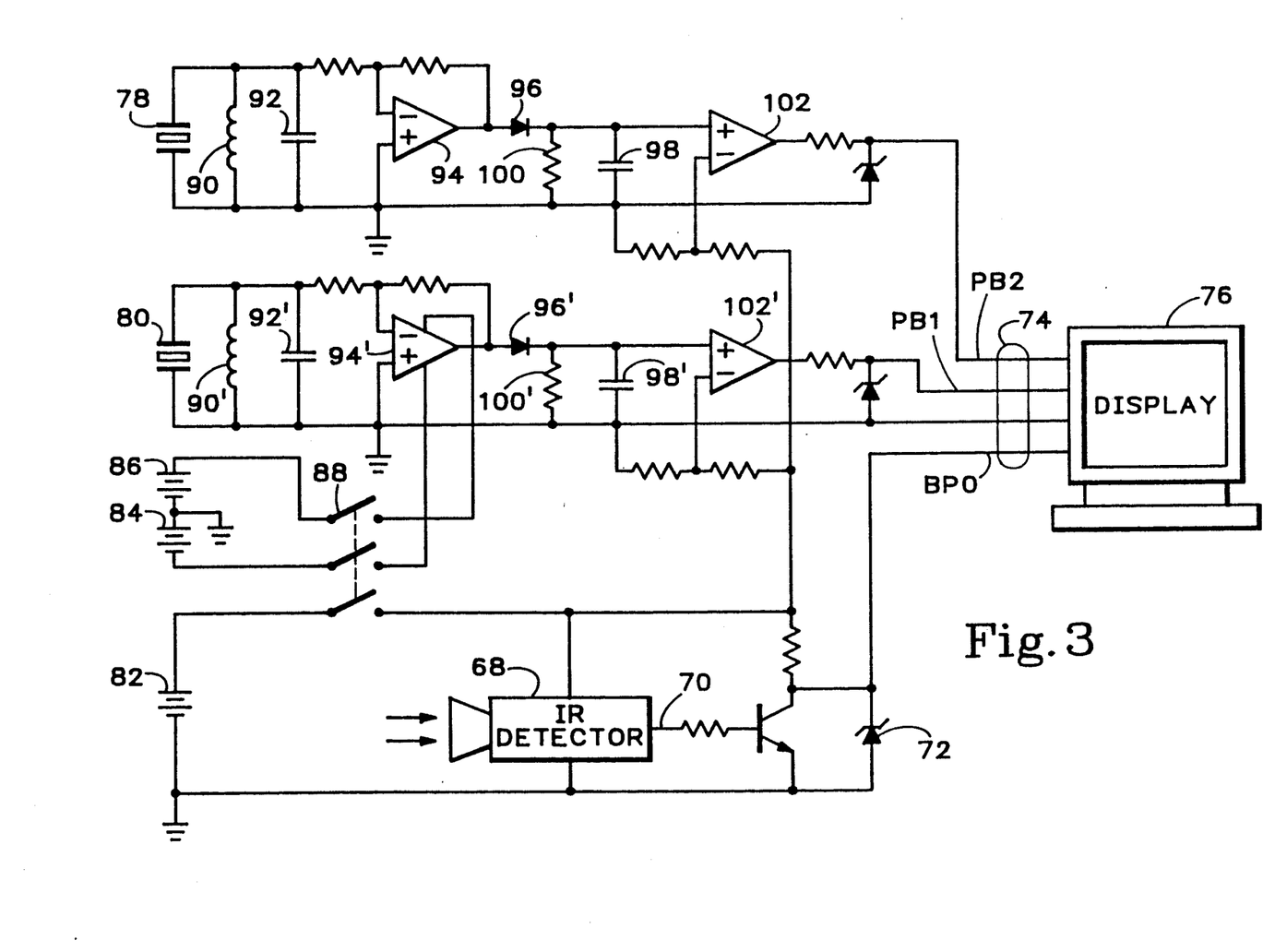
FIG. 3 is a schematic diagram of an electric circuit of receiver components usable in the hitching aid of this invention.

The ultrasonic burst signals transmitted from he transducer 66 are detected by the ultrasonic transducers 78 and 80. These are separated by a known distance, for example 1 meter. The operation of the electric circuit associated with each of these transducers is the same, and therefore the following description of the operation of the circuit of transducer 78 is not repeated for the circuit of transducer 80. However, the corresponding electrical components for the circuit of transducer 80 are identified by the same reference numerals as the components of the circuit of transducer 78, but distinguish therefrom by a superscript.

The electric circuits for the receivers 68, 78 and 80 are supplied with electric potential from batteries 82, 84 and 86 through control switches 88 which preferably are ganged for simultaneous operation.

Sound is converted to a low level electrical signal by transducer 78. The tank circuit inductor 90 and capacitor 92 increases the selectivity and sensitivity. The tank circuit is tuned to the input carrier frequency which, in the exemplified arrangement, is 40 KHz. Amplifier 94 amplifies the signal from the tank circuit, for example 25 times. Diode 96 rectifies the amplified signal and capacitor 98 filters the amplified signal.

When a sound burst is being detected, the voltage on capacitor 98 builds from near zero to nearly nine volts, for a strong signal. After the sound burst, resistor 100 slowly bleeds the charge on capacitor 98 so that the voltage on the capacitor settles back to zero. Amplifier 102 is configured as a comparator that switches when the voltage on capacitor 98 crosses a predetermined voltage, e.g. 4.5 volts. The output of amplifier 102 is low when no sound is detected and is high when sound is detected.

The circuits of transducer 78 and 80 send their signals to the display of computer 76, being interfaced to the Apple II computer through the PB2 and PB1 inputs, respectively, of the game paddle connector 74.

The display, herein exemplified as an Apple II computer 76, is composed of any suitable device that can monitor the received signals and process them into distance and direction information. In the computer illustrated, the computer program monitors the signals at the inputs PB0, PB1 and PB2 of the game paddle connector. When the program senses that input PB0 goes low, indicating the detection of an infrared light burst, the program records the time. Inputs PB1 and PB2 then are monitored until each of them goes high, indicating the detection of sound bursts. The program records the time of the events at these inputs.

Since light travels much faster than sound, the light signal reaches the receiver 68 almost the instant it leaves the transmitter 20, but the sound pulses from the transmitter take much longer time to reach the ultrasonic transducers 78 and 80. The difference in time between the received light and sound signals then is used to calculate the distance from each receiver 68, 78 and 80 to the transmitter 20.

Referring to FIG. 1 of the drawings, direction is calculated according to the following relationships:

The distance from the transmitter 20 to sound receiver 78 is given by the equation $$S1 = ct1$$

and to sound receiver 80 by the equation $$S2 = ct2$$

where S1 is the distance in meters between the transmitter 20 and sound receiver 78; S2 is the distance in meters between the transmitter 20 and sound receiver 80; c is the velocity of sound in air (331 meters per second); t1 is the time delay between arrival of the light burst at receiver 68 and the arrival of the sound burst at receiver 78; and t2 is the time delay between arrival of the light burst at receiver 68 and the arrival of the sound burst at receiver 80.

To determine the direction angle B, the law of cosines is employed (X is the distance in meters between the ultrasonic transducers 78 and 80):

$$\cos A1 = \frac{X^2 + S1^2 - S2^2}{2XS1} \text{ and}$$

$$\cos A2 = \frac{X^2 + S2^2 - S1^2}{2XS2} \text{ and}$$

$$L^2 = S1^2 + \left(\frac{X}{2}\right)^2 - 2S1\left(\frac{X}{2}\right)\cos A1$$

Therefore, $$\cos B = \frac{L^2 + \left(\frac{X}{2}\right)^2 - S1^2}{2L\left(\frac{X}{2}\right)} = \frac{\frac{X}{2} - S1 \cos A1}{L} = \frac{X}{2L} -$$

$$\frac{S1}{L}\left(\frac{X^2 + S1^2 - S2^2}{2XS1}\right) \text{and}$$

$$B = \cos^{-1}\left[\frac{X}{2L} - \frac{S1}{L}\left(\frac{X^2 + S1^2 - S2^2}{2XS1}\right)\right]$$

Accordingly, the computer indicates on its screen the distance and direction to the transmitter.

FIGS. 4-10 and 4A-10A illustrate schematically the operation of the hitching aid described hereinbefore in directing an operator to back up the towing vehicle 14 toward a vehicle 10 to be towed and ultimately to bring the hitch components 12 and 18 into coupling registration.

FIGS. 4-10 show the towing vehicle 14 in various positions of backing toward the vehicle 10 to be towed, and FIGS. 4A-10A show the distance and angular position of the towing vehicle relative to the vehicle to be towed. In the embodiment illustrated, the display screen of the computer 76 displays an inverted T formed of a plurality of light spots 104 disposed horizontally and a plurality of light spots 106 extending vertically upward from the center spot of the horizontal row. The vertical row represents distance, in feet, between the hitch components 12 and 18 on the vehicles 10 and 14, respectively, and the horizontal row represents the angular disposition of the towing vehicle 14 relative to the vehicle 10 to be towed. This angular disposition is indicated by angle B in FIGS. 4-9.

The following Table identifies exemplified distances and angular directions of the receivers 68, 78 and 80 relative to the transmitter 20;

TABLE

| FIG. | A1  | B  | A2 | S1(ft) | L(ft) | S2(ft) |
|------|-----|----|----|--------|-------|--------|
| 4    | 97  | 78 | 73 | 19.4   | 19.7  | 20.1   |
| 5    | 99  | 76 | 70 | 16.3   | 16.6  | 17.1   |
| 6    | 74  | 99 | 92 | 13.6   | 13.2  | 13.1   |
| 7    | 115 | 56 | 50 | 10.3   | 11.1  | 12.1   |
| 8    | 100 | 68 | 58 | 7.5    | 8.0   | 8.7    |
| 9    | 68  | 90 | 68 | 4.5    | 4.2   | 4.5    |

Figure 4:
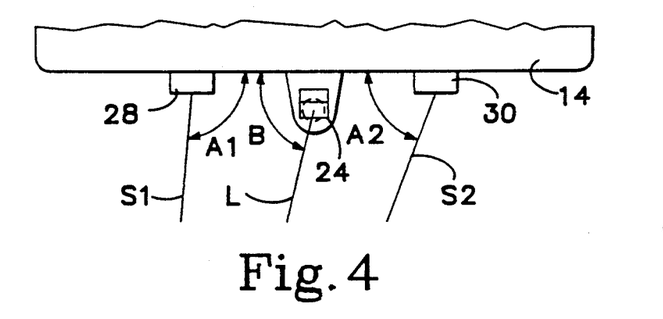
FIGS. 4, 4A, 5, 5A, 6, 6A, 7, 7A, 8, 8A, 9, 9A, 10 and 10A, respectively, are schematic illustrations showing the mode of operation of the hitching aid in directing the maneuvering of a towing vehicle into position for coupling the hitch component thereon to the associated hitch component on a vehicle to be towed.
Figure 4A:
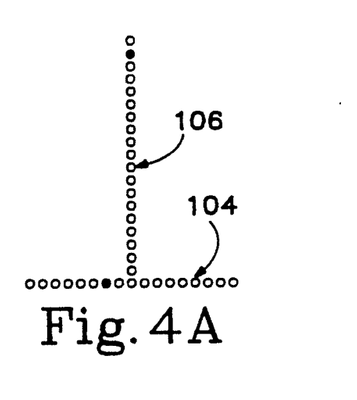

With the towing vehicle at the FIG. 4 position, the infrared light receiver 24 is about 19 ft from the transmitter 20 and angle B is 78°. Accordingly, the display 76 at the operator's position in the towing vehicle 14 gives indication by the darkened spot on the vertical leg 106 of the display that the distance to the vehicle 10 to be towed is about 19 ft. The darkened spot to the left of the center spot on the horizontal leg 104 of the display indicates to the operator that he should turn the steering wheel to the left.

Figure 5:
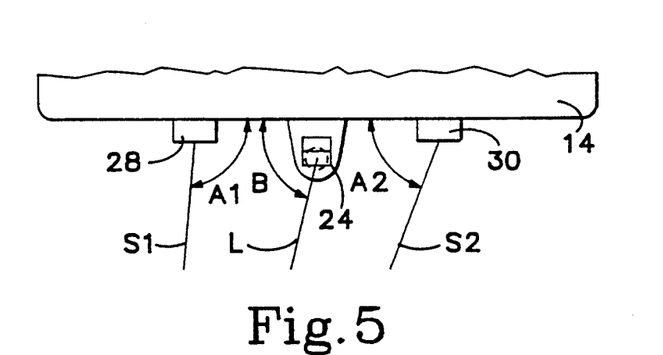
Figure 5A:
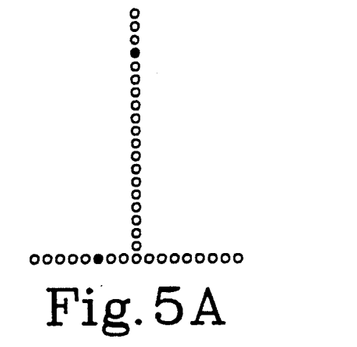

FIG. 5 shows the towing vehicle 14 moved closer to the vehicle 10 and angle B slightly decreased. FIG. 5A shows the distance to be about 16 ft and the angle about 76°, indicating to the operator to turn to the left.

Figure 6:
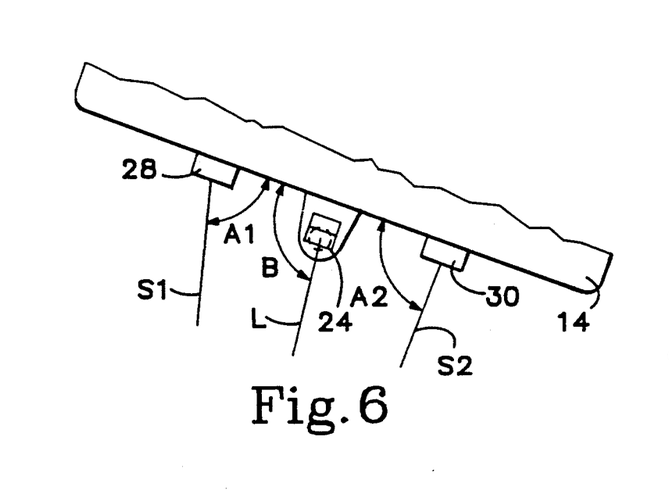
Figure 6A:
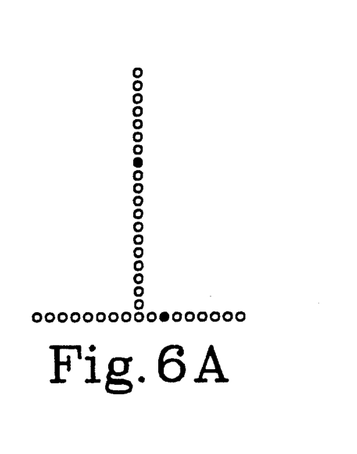

FIG. 6 shows the towing vehicle moved still closer to the vehicle 10 and angle B increased to 99°. FIG. 6A shows the distance to be about 13 ft and the darkened spot to the right of center on the horizontal leg indicates to the operator that steering was over-corrected and the steering wheel now should be turned to the right.

Figure 7:
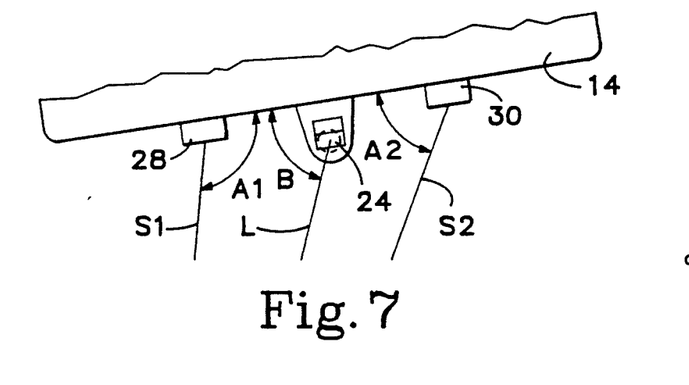
Figure 7A:
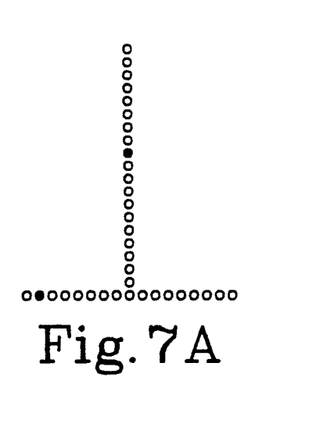

FIG. 7A shows over-correction in the opposite direction, since the darkened spot on the horizontal leg now is to the far left of center, indicating to the operator to steer to the left. The darkened spot on the vertical leg shows the towing vehicle 14 to be about 11 ft from the vehicle 10 to be towed.

Figure 8:
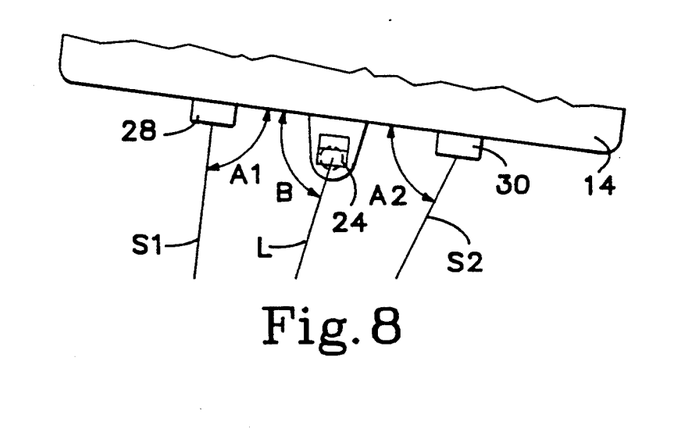
Figure 8A:
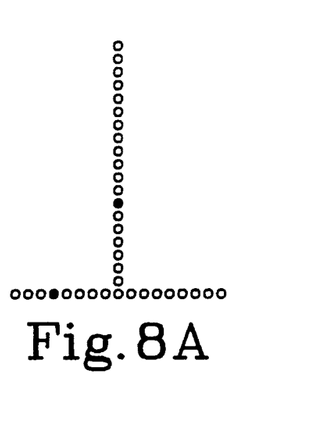

FIG. 8A shows instruction to turn still more to the left, with the distance now reduced to about 8.0 ft.

Figure 9:
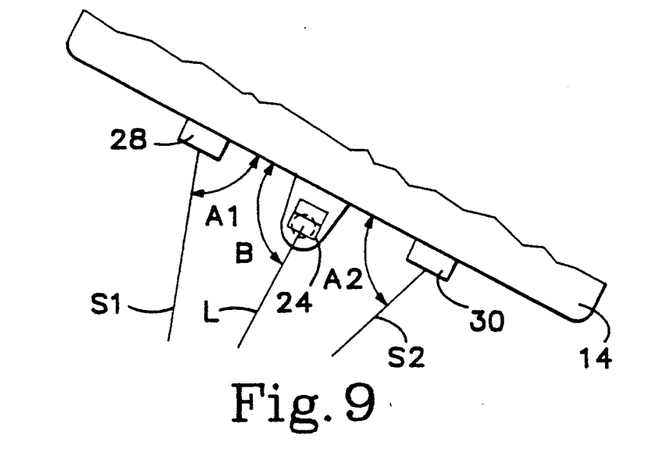
Figure 9A:
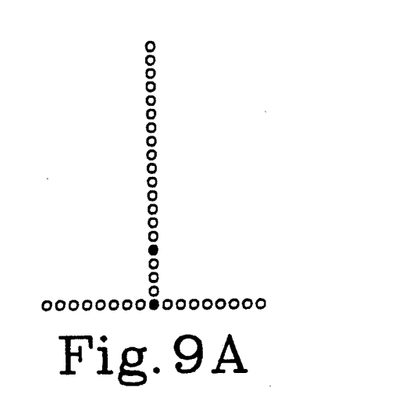
Figure 10:
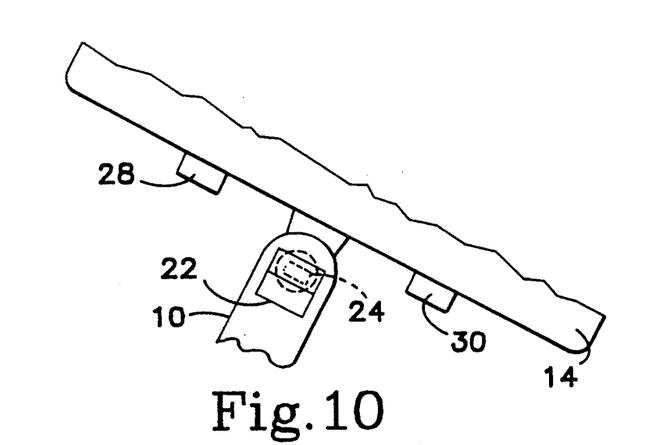
Figure 10A:
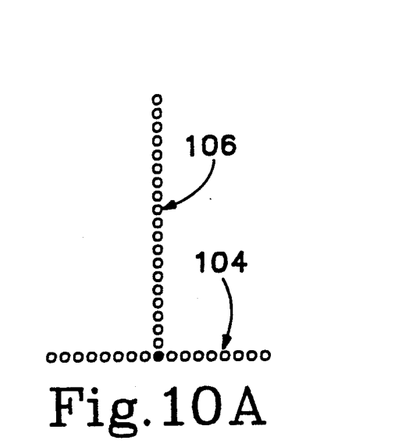

FIG. 9A shows the towing vehicle to be about 4.2 ft from the vehicle to be towed, and with the hitch component 18 in line with hitch component 12. The operator now moves the towing vehicle straight rearward until the darkened spot is located at the intersection of the bottom of the vertical leg and the center of the horizontal leg, as shown in FIG. 10A. The hitch components 12 and 18 now are in vertical registry, as shown in FIG. 10.

From the foregoing, it will be appreciated that this invention provides for the coupling of hitch components on a towing vehicle and a vehicle to be towed, with speed, facility and precision, with a device that is of economical construction, is capable of being installed on all types of vehicles, and requires minimum maintenance and repair.

It will also be appreciated that the invention may be utilized for other purposes, such as determining the position of one object relative to the position of another object, in terms of distance and angle between the objects. As an illustration, the invention may be used to direct a robot to a work station. As another illustration, the invention may be used simply to identify the position of a first object relative to a second object without having the second object move to the first object. Other uses may be found for the invention, as will be apparent.

It will also be apparent to those skilled in the art that various changes may be made in the size, shape, type, number and arrangement of mechanical components and in the number and types of circuit components described hereinbefore without departing from the spirit of this invention and the scope of the appended claims.

I claim:

1. The method of moving a hitch component on a towing vehicle into coupling registry with a companion hitch component on a vehicle to be towed comprising:
   a) mounting on the vehicle to be towed a transmitter capable of transmitting simultaneously first and second intermittent signals, the first signal of which travels through air at a higher velocity than the second signal,
   b) mounting on the towing vehicle a first receiver for receiving said first higher velocity signal and a pair of laterally spaced second receivers for receiving said second lower velocity signal,
   c) transmitting said signals as the towing vehicle is moved toward the vehicle to be towed,
   d) measuring the time difference between the reception of said first signal of higher velocity and the reception of said second signal of lower velocity, and
   e) utilizing said measured time differences to produce for the operator of the towing vehicles a visual display of the distance and angles between the vehicles as the towing vehicle is moved toward the vehicle to be towed, to aid the operator in maneuvering the towing vehicle to move the hitch component on the towing vehicle into coupling registry with the hitch component on the vehicle to be towed.

2. The method of claim 1 wherein said first signal is intermittent pulses of infrared light and said second signal is intermittent pulses of ultrasonic sound.

3. The method of claim 1 wherein said measured time differences are utilized by a computer to calculate and present on a computer screen a visual display of distances and angles between vehicles.

4. A trailer hitching aid, comprising:
   a) a transmitter capable of transmitting simultaneously first and second intermittent signals, the first signal of which travels through air at a higher velocity than the second signal,
   b) means for mounting the transmitter on a vehicle to be towed,
   c) a first receiver capable of receiving said first higher velocity signal,
   d) a pair of second receivers capable of receiving said second lower velocity signal,
   e) means for mounting said first receiver on a towing vehicle,
   f) means for mounting said pair of second receivers in laterally spaced apart position on the towing vehicle,
   g) means connected to the first and second receivers for measuring the time difference between reception of said first higher velocity signal by said first receiver and reception of said second lower velocity signal by each of said second receivers, and
   h) means connected to said measuring means for producing from said measurements a visual display of the distances and angles between the vehicles as the towing vehicle is moved toward the vehicle to be towed, the visual display producing means being arranged for positioning in the towing vehicle for viewing by the vehicle operator, to aid the operator in maneuvering the towing vehicle to move a hitch component on a towing vehicle into coupling registry with a complimentary hitch component on a vehicle to be towed.

5. The trailer hitching aid of claim 4 wherein said transmitter provides said first signal as infrared light pulses and said second signal as ultrasonic sound pulses simultaneously with said infrared light pulses.

6. The trailer hitching aid of claim 4 wherein said measuring means comprises a computer which measures the time differences and calculates therefrom the distances and angles between the vehicles.

7. The trailer hitching aid of claim 6 wherein said visual display producing means comprises a computer screen for displaying said distances and angles between the vehicles.

* * * * *